(12) United States Patent
Wang et al.

(10) Patent No.: US 7,704,293 B2
(45) Date of Patent: Apr. 27, 2010

(54) TURBULENCE DEVICE USED FOR AIR FILTRATION SYSTEM

(75) Inventors: Wen-Hwa Wang, Taoyuan County (TW); Yu-Chen Chang, Taoyuan County (TW); Kui-Yuan Cheng, Taoyuan County (TW)

(73) Assignee: Institute of Nuclear Energy Research, Longton, Taoyuan (TW)

( * ) Notice: Subject to any disclaimer, the term of this patent is extended or adjusted under 35 U.S.C. 154(b) by 310 days.

(21) Appl. No.: 11/876,783

(22) Filed: Oct. 23, 2007

(65) Prior Publication Data

US 2009/0101018 A1 Apr. 23, 2009

(51) Int. Cl.
*B01D 51/00* (2006.01)
(52) U.S. Cl. .............. 55/418; 55/418.1; 55/419
(58) Field of Classification Search ........... 55/518, 55/518.1, 519
See application file for complete search history.

(56) References Cited

U.S. PATENT DOCUMENTS

| | | | | | |
|---|---|---|---|---|---|
| 2,880,079 | A | * | 3/1959 | Cornelius | 422/107 |
| 3,831,354 | A | * | 8/1974 | Bakke | 55/418 |
| 3,840,051 | A | * | 10/1974 | Akashi et al. | 138/37 |
| 3,918,422 | A | * | 11/1975 | Kargilis | 123/548 |
| 3,922,136 | A | * | 11/1975 | Koch | 431/115 |
| 3,973,916 | A | * | 8/1976 | Shelton | 422/174 |
| 4,000,086 | A | * | 12/1976 | Stoev et al. | 516/53 |
| 4,061,082 | A | * | 12/1977 | Shuler | 454/298 |
| 4,067,692 | A | * | 1/1978 | Farris | 422/124 |
| 4,108,934 | A | * | 8/1978 | Rubens et al. | 264/53 |
| 4,436,022 | A | * | 3/1984 | Zboralski et al. | 454/59 |
| 4,796,596 | A | * | 1/1989 | Coker | 123/593 |
| 5,167,577 | A | * | 12/1992 | Kristensson | 454/298 |
| 5,306,140 | A | * | 4/1994 | Smith | 431/328 |
| 5,853,579 | A | * | 12/1998 | Rummler et al. | 210/170.01 |
| 5,989,013 | A | * | 11/1999 | Gray | 431/326 |
| 6,267,793 | B1 | * | 7/2001 | Gomez et al. | 55/385.2 |
| 6,561,895 | B2 | * | 5/2003 | McGill | 454/298 |
| 6,712,869 | B2 | * | 3/2004 | Cheng et al. | 55/418 |
| 6,887,294 | B2 | * | 5/2005 | Kanematsu | 55/418 |
| 6,958,011 | B2 | * | 10/2005 | Gebke | 454/306 |
| 2008/0145285 | A1 | * | 6/2008 | Olbert et al. | 422/220 |

* cited by examiner

*Primary Examiner*—Walter D Griffin
*Assistant Examiner*—Amber Orlando

(57) ABSTRACT

The invention is related to a turbulence device used for air filtration system. The turbulence device comprises a porous plate and a spoiler. The porous plate has a plural number of holes located on one side of the spoiler. The spoiler has a square hole. The turbulence device in the invention is used for an air filtration system and its testing to increase even mixing of the air and a plural number of fine particles in the air and increase the efficiency for the air filtration system. In the testing of the air filtration system, even mixing of the air and the fine particles can improve the accuracy of the air filtration system and avoid the use of unqualified air filtration system to harm the environment.

11 Claims, 6 Drawing Sheets

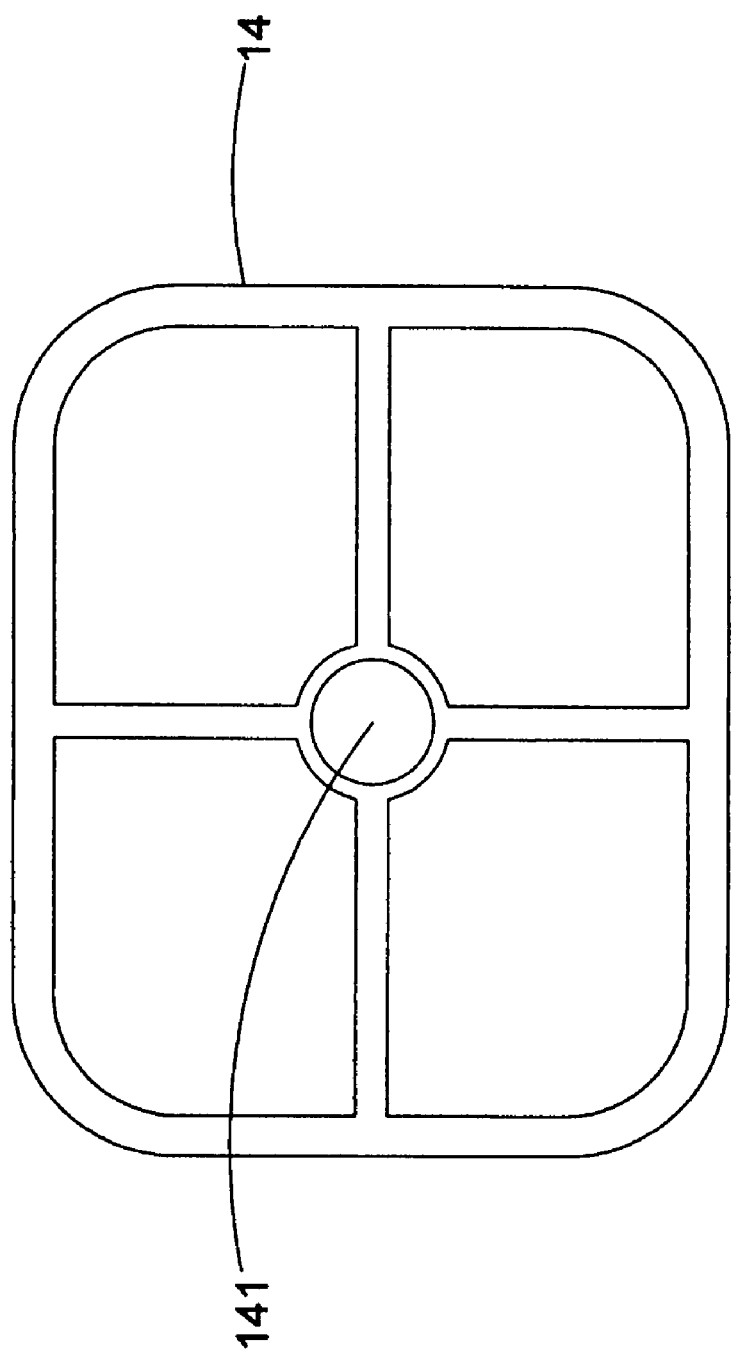

TURBULENCE DEVICE USED FOR AIR FILTRATION SYSTEM

FIELD OF THE INVENTION

The invention is related to a turbulence device, especially a turbulence device used for air filtration system.

DESCRIPTION OF THE PRIOR ART

A general air filtration system comprises a front air duct, a rear air duct, a high-efficiency air filter and an exhaust fan. After the air filtration system starts, air containing polluting fine particles enters from the front air duct and passes the high-efficiency air filter where the polluting fine particles will be captured, and finally the filtered air leaves from the rear air duct. To assure the air filtration system operates normally to remove the polluting fine particles, it is necessary to test the filtration efficiency for the air filtration system. When the efficiency meets a certain standard value, the air filtration system is qualified for use.

However, in the process of testing the air filtration system, whether the fine particles and air are evenly mixed in the sample affects the accuracy for testing the air filtration system. If air and fine particles are not mixed evenly, the testing is not representative and the result will not be accurate.

To mix air and fine particles evenly, it is necessary to increase the length of the air filtration system and increase the distance between fine particles in the air. But the limited space for the air filtration system makes the testing result for the air filtration system unrepresentative. To solve the above issue, the invention provides a turbulence device used for air filtration system.

SUMMARY OF THE INVENTION

The primary objective for the invention is to provide a turbulence device used for air filtration system that can mix air and fine particles evenly and the efficiency for the air filtration system.

The secondary objective for the invention is to provide a turbulence device used for air filtration system that can be used for testing the air filtration system by evenly mixing air and fine particles to increase the accuracy for testing the air filtration system.

To achieve the above objectives, the invention is a turbulence device used for air filtration system. The turbulence device comprises a porous plate with a plural number of holes and a spoiler with a square hole. The spoiler is located on one side of the porous plate. When the turbulence device is installed in an air filtration system, the porous plate for the turbulence device generates turbulence for the entered air that contains a plural number of fine particles to mix the air and the fine particles. Then, when the air passes the spoiler, the spoiler mixes the air and the fine particles evenly again.

Other objects, advantages and novel features of the invention will become more apparent from the following detailed description when taken in conjunction with the accompanying drawings.

BRIEF DESCRIPTION OF THE DRAWINGS

FIG. 5A: an illustration for the sample porous plate in another preferred embodiment for the invention.

DETAILED DESCRIPTION OF THE PREFERRED EMBODIMENT

Figure 1:
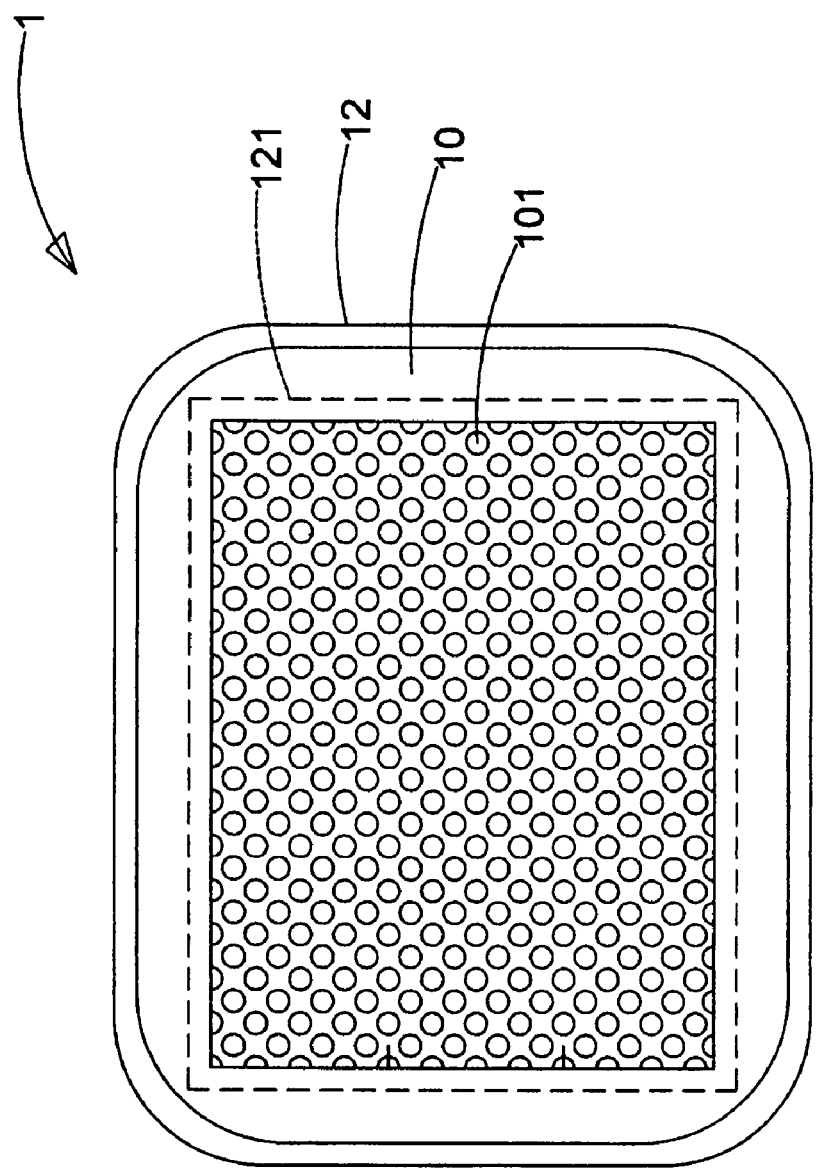
FIG. 1: an illustration for the turbulence device in a preferred embodiment for the invention.

For the examiners for the invention to further understand the structural characteristics and achieved benefits for the invention, detailed description for the preferred embodiment is provided in the following:

Please refer to FIG. 1 for an illustration of a turbulence device 1 in a preferred embodiment for the invention. The turbulence device 1 is used for an air filtration system to evenly mix the fine particles and the air when the air containing a plural number of fine particles is passing the turbulence device 1, or for the sample of a plural number of fine particles to evenly mix into the air when they are passing the turbulence device in the testing of the efficiency of an air filtration system, so it can increase the accuracy for testing the efficiency for an air filtration system.

The turbulence device 1 in the invention comprises a porous plate 10 and a spoiler 12. The porous plate 10 has a plural number of holes 101. The spoiler 12 is located on one side of the porous plate 10. The spoiler 12 has a square hole 121. The turbulence device 1 in the invention is used for air filtration system. When air containing a plural number of fine particles enters an air filtration system, it passes the turbulence device 1 and the particles strike the porous plate 10 for the turbulence device 1. Because the porous plate 10 generates turbulence for the fine particles in the air and increases mixing of the air and the fine particles. Then the air passes the spoiler 12, which generates turbulence for the air to increase movement and also increase mixing of the air and the fine particles, so the air and the fine particles are mixed evenly.

Figure 2:
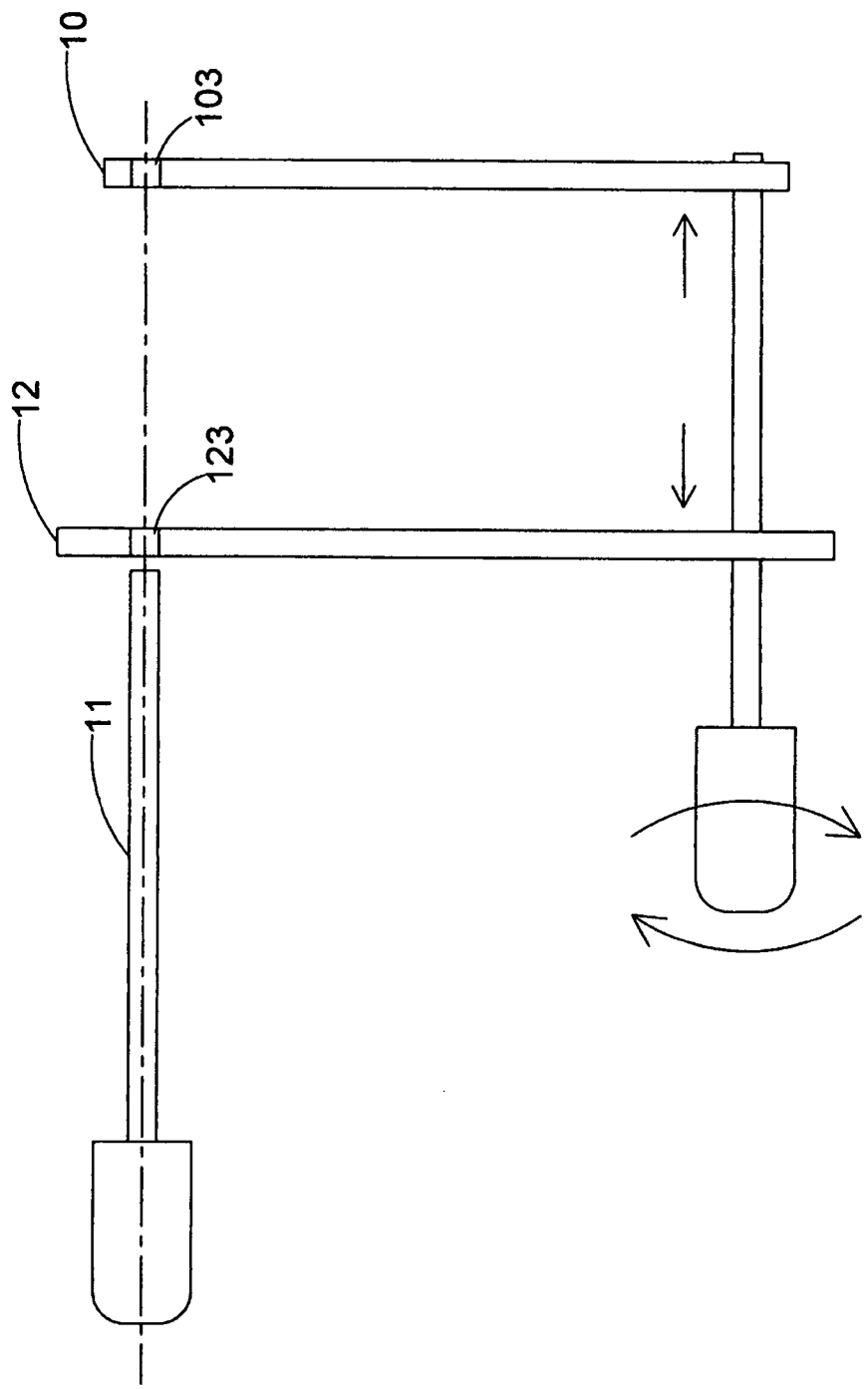
FIG. 2: an illustration for the turbulence device in another preferred embodiment for the invention.

Please refer to FIG. 2 for an illustration of a preferred embodiment for the invention used in an air filtration system. As shown in the figure, the turbulence device 1 for this embodiment has two adjusting screws 11 between the porous plate 10 and the spoiler 12. The two corresponding sides on the porous plate 10 have two screw holes 103. The two corresponding sides on the spoiler 12 also have two screw holes 123. The two screw holes 123 on the spoiler 12 correspond the two screw holes 103 on the porous plate 10. The two adjusting screws 11 pass through the screw holes 123. The distance between the porous plate 10 and the spoiler 12 can be adjusted by the two adjusting screws 11.

Figure 3:
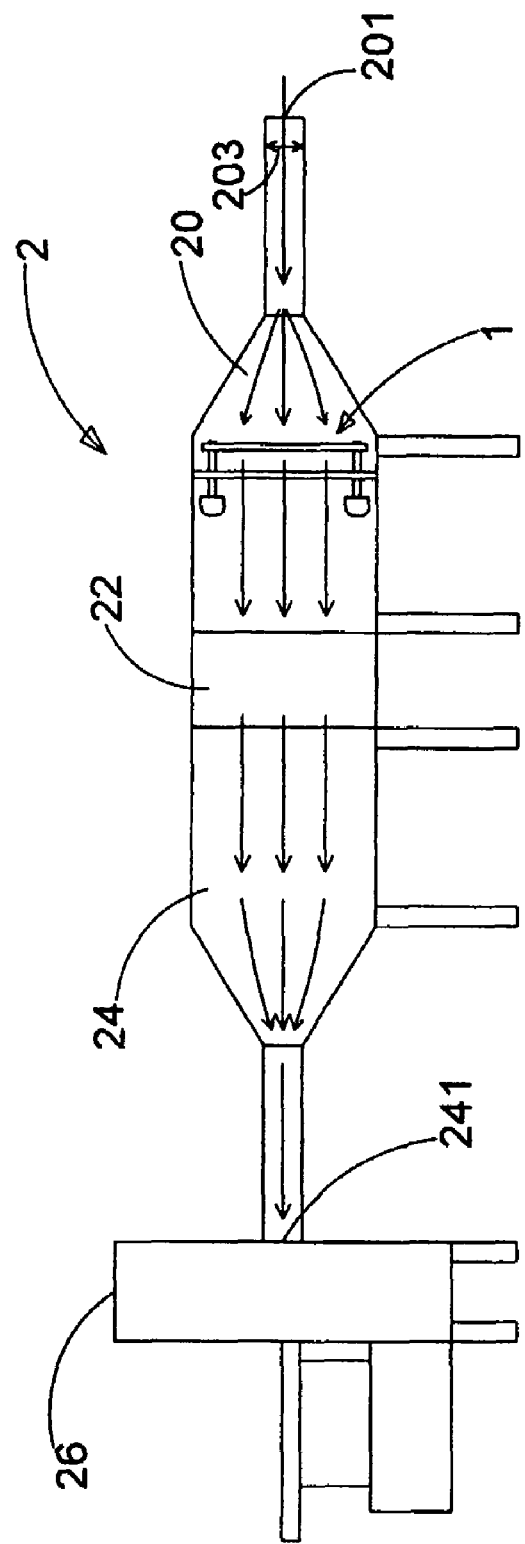
FIG. 3: an illustration for the device used for air filtration system in another preferred embodiment for the invention.
Figure 4:
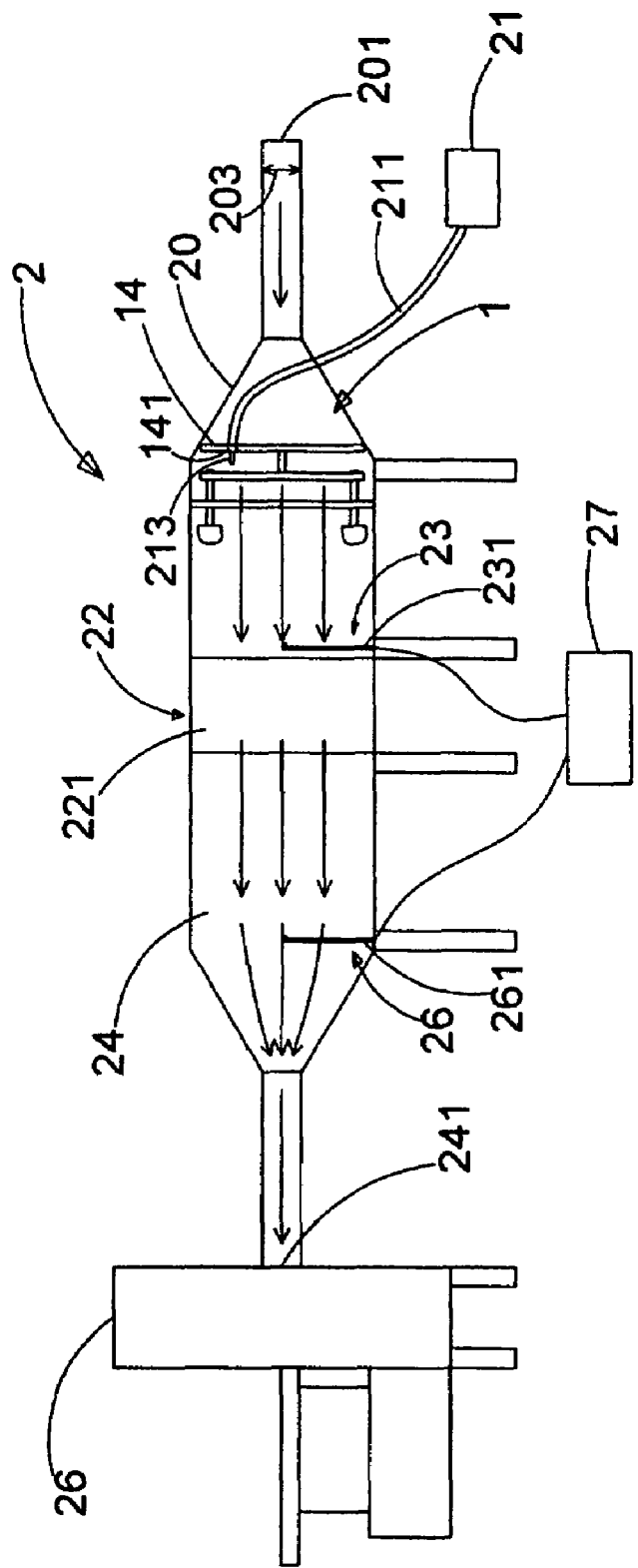
FIG. 4: an illustration for the device used for testing air filtration system in another preferred embodiment for the invention.
Figure 5B:
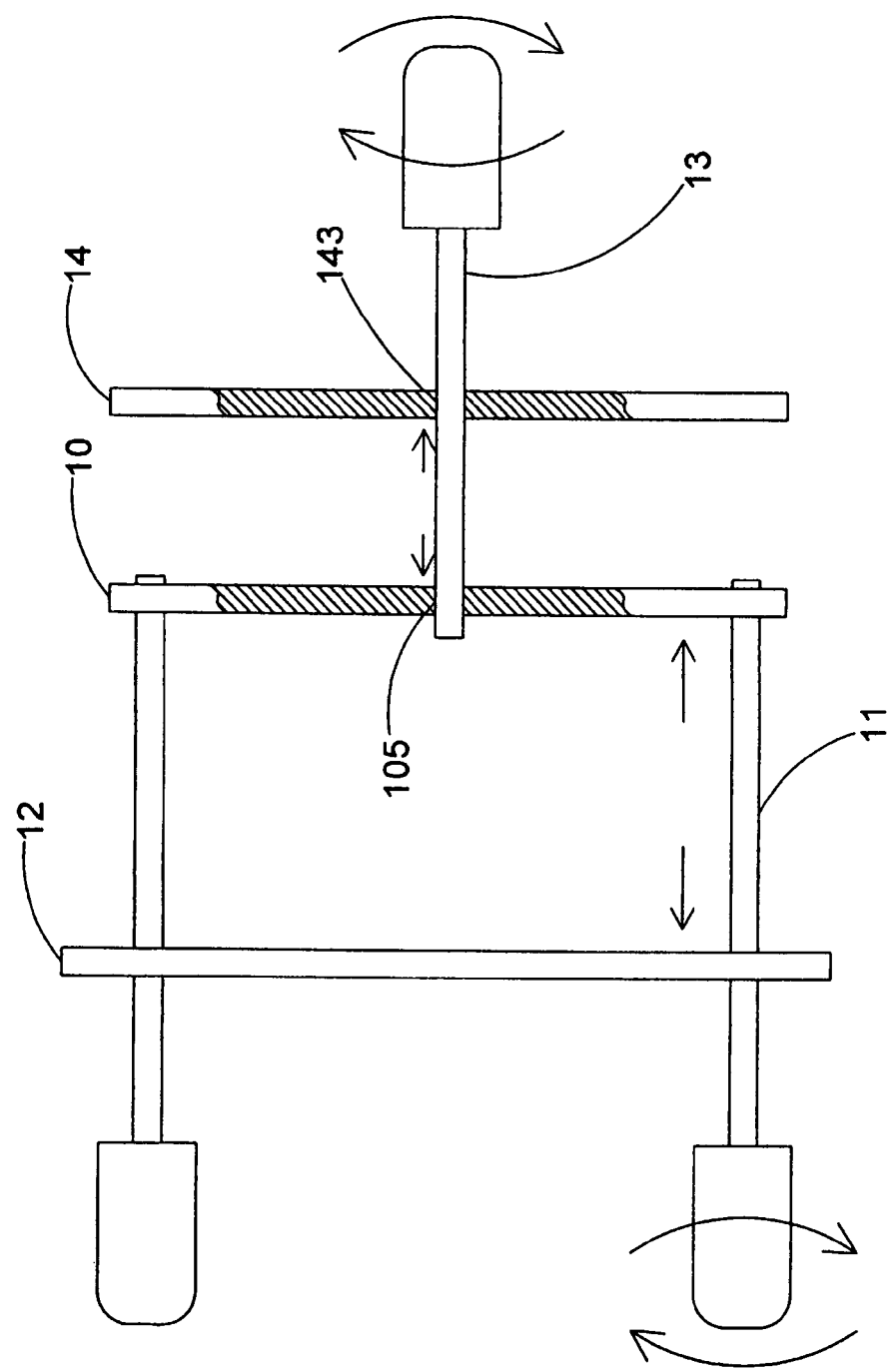
FIG. 5B: an illustration for the turbulence device in another preferred embodiment for the invention.

Please refer to FIG. 3 for an illustration of another preferred embodiment for the invention used in an air filtration system. As shown in the figure, the turbulence device 1 for the embodiment is used for an air filtration system 2. The air filtration system 2 comprises a first air duct 20, a filtration device 22, a second air duct 24 and an exhaust fan device 26. The filtration device 22 is located between the first air duct 20 and the second air duct 24. The first air duct 20 has an inlet 201. The second air duct 24 has an outlet 241. The exhaust fan device 26 is located at the outlet 241 to guide the air containing a plural number of fine particles and entering from the inlet 201 of the first air duct 20 to flow toward the outlet 241 of the second air duct 24. The turbulence device 1 is device is located in the first air duct 20. The spoiler 12 for the turbulence device 1 has a square hole 121 (please refer to FIG. 1). The size for the square hole 121 is proportional to the inlet 203 diameter. The inlet 203 diameter determines the square hole 121 size. The distance between the turbulence device 1 and the filtration device 22 is between four times of the inlet 203 diameter and six times of the inlet 203 diameter.

When air containing fine particles enters from the inlet 201, the fine particles first strike the porous plate 10 that disturbs the flow of the fine particles and increases the mixing of the fine particles and the air. Then the air containing the fine particles passes the spoiler 12 that disturbs the airflow and increases the mixing of the air and the fine particles. Thus, the air and the fine particles mix evenly within a short distance to increase the filtration efficiency for the air filtration system 2.

Please refer to FIG. 4 for an illustration of another preferred embodiment for the invention used for testing the air filtration system. As shown in the figure, the turbulence device 1 in FIG. 2 is put in an air filtration system 2 for testing the air filtration system 2. The turbulence device 1 further comprises a sample porous plate 14. The sample porous plate has at least a sample hole 141, which is located on one side of the porous plate 10 for the turbulence device 1 and corresponds to the spoiler 12. The air filtration system 2 comprises a first air duct 20, a filtration device 22, a second air duct 24, an exhaust fan device 26, a sample generator 21, an analytical device 27, a first sampling device 23 and a second sampling device 25. The turbulence device 1 is located in the first air duct 20 and its distance to the filtration device 22 is between four times of the diameter of the inlet 203 for the first air duct 20 and six times of the diameter of the inlet 203. The sample generator 21 has at least a sample conduit 211, which connects the sample hole 141, at least one, on the sample porous plate 14. There is at least an injector 213 in front of the sample hole 141. The sample generator 21 produces the sample of a plural number of fine particles. The sample of the fine particles flows through at least a sample conduit 211 to at least a sample hole 141 to release. The fine particles are subject to movement by the air introduced from the inlet 201 of the first air duct 20 to move toward the filtration device 22.

The first sampling device 23 is located between the filtration device 22 and the turbulence device 1 and is very close to the filtration device 22. The first sampling device 22 has at least a sampling unit 231, while the filtration device 22 has at least a filtration unit 221. The sampling unit 231 corresponds to the filtration unit 221. The quantity for the sampling units 231 depends on the quantity for the filtration units 221 to assemble the filtration device 22. The filtration unit 221 is a high-efficiency air filter. The first sampling device 23 is to sample the unfiltered air, which contains the fine particles.

The second sampling device 25 is located in the second air duct 24 and has at least a sampling unit 251. The quantity for the sampling unit 251 is the same as that for the sampling unit 231 for the first sampling device 23. They also correspond to the filtration unit 221. The second sampling device 25 is to air sample that has been filtered by the filtration device 22 and contains the fine particles.

The analytical device 27 connects to the first sampling device 23 and the second sampling device 25. The analytical device is used to determine the concentration for the unfiltered air obtained by the first sampling device 23. The analytical device is also used to determine the concentration for the unfiltered air obtained by the second sampling device. Comparing the concentration for both unfiltered and filtered air can obtain filtration efficiency. The analytical device is an aerosol concentration detector.

The embodiment uses the turbulence device 1 of the invention for testing the air filtration system 2. The turbulence device 1 is to evenly mix the sample of fine particles and the air to increase the accuracy for the filtration efficiency of the air filtration system 2. If the air and the sample of fine particles cannot mix evenly, it means the sample of fine particles does not pass some part of the filtration device 22 for the air filtration system 2 and correct filtration efficiency for the air filtration system 2 cannot be obtained. If the turbulence device 1 of the invention is not used, the sample of fine particles and the air have to evenly mix with the distance between sample location and the filtration device 22 being ten times of the inlet diameter. It takes such a long distance to evenly mix the fine particles and the air. The turbulence device for the invention can mix the fine particles and the air within a short distance, which shortens the entire air filtration system 2 and does not waste space.

Please refer to FIGS. 5A and 5B for an illustration of the sample porous plate and an illustration of the turbulence device in another preferred embodiment for the invention. As shown in the figures, the turbulence device 1 in FIG. 4, compared to the turbulence device 1 in FIG. 2, has a sample porous plate 14 on one side of the porous plate 10. The sample porous plate 14 corresponds to the spoiler 12 and has at least a sample hole 141. Between the porous plate 10 and the sample porous plate 14 there are two adjusting screws 13. There are two screw holes 105 on the corresponding two sides of the porous plate 10. There are also two screw holes 143 on the corresponding two sides of the sample porous plate 14. The two screw holes 143 for the sample porous plate 14 correspond to the two screw holes 105 for the porous plate 10. The two adjusting screws 13 pass through the screw holes 105, 143. By adjusting the two adjusting screws 13, the distance between the porous plate 10 and the sample porous plate 14 can be adjusted.

It is known from the above that the invention provides a turbulence device used for air filtration system. The turbulence device for the invention can evenly mix the air in the air filtration system and the fine particles. Thus, the filtration device for the air filtration system can have increased efficiency. Besides, the turbulence device for the invention can be used to testing air filtration system because the turbulence device can evenly mix the sample of fine particles and the air. This will greatly improve the accuracy for the testing result and help determine whether the air filtration system meets standard. Qualified air filtration system in use for industry can minimize environmental hazards and protect people's health.

In summary, the invention is innovative, progressive and available for industrial use, and shall meet the requirements by our patent laws. Therefore, the application is submitted for review and approval.

The above description is only for preferred embodiments, but not to limit the scope of the invention. Those equivalent alteration and modification with respects to shape, structure, characteristics and principle of the invention shall all fall in the claims of the invention.

What is claimed is:

1. A turbulence device used for air filtration system comprises:

a porous plate that has a plural number of holes; and a spoiler that has a square hole located on one side of the porous plate to enable even mixing of the air containing a plural number of fine particles and the particles when the air is passing the porous plate and the spoiler; between the porous plate and the spoiler there is at least an adjusting screw to adjust the distance between them.

2. As described in claim 1 for the turbulence device used for air filtration system, the porous plate has at least a screw hole and the spoiler has at least a screw hole corresponding to that on the porous plate; at least one adjusting screw passing through the porous plate and at least one adjusting screw passing through the spoiler are used to adjust the distance between the porous plate and the spoiler.

3. As described in claim 1 for the turbulence device used for air filtration system, the air filtration system comprises:
   a first air duct that has an inlet;
   a filtration device located on one side of the first air duct to filter the air that contains fine particles and enters from the inlet of the first air duct; and
   a second air duct that has an outlet located on the other side of the filtration device to exhaust filtered air;
   with the turbulence device being located in the air duct and before the filtration device to evenly mix the air from the inlet and the fine particles contained in the air.

4. As described in claim 3 for the turbulence device used for air filtration system, the size for the square hole for the spoiler on the turbulence device is proportional to the inlet diameter and varies with the inlet diameter.

5. As described in claim 3 for the turbulence device used for air filtration system, the distance between the turbulence device and the filtration device is between four times of the inlet diameter and six times of the inlet diameter.

6. As described in claim 3 for the turbulence device used for air filtration system, it further contains:
   an exhaust fan device located at the outlet of the second air duct to guide the air from the inlet toward the outlet.

7. As described in claim 3 for the turbulence device used for air filtration system, it further contains:
   a sample generator located in the first air duct, and between the turbulence device and the inlet there is at least a sample conduit, so the sample generator can produce a sample of a plural number of fine particles to mix evenly with the air by the turbulence device.

8. As described in claim 7 for the turbulence device used for air filtration system, it further contains:
   a sample porous plate located on the other side of the porous plate for the turbulence device and corresponding to the spoiler for the turbulence device, and the sample porous plate having at least one sample hole to connect at least one sample conduit, so the sample of fine particles produced by the sample generator flows through the sample conduit to the sample hole to release.

9. As described in claim 8 for the turbulence device used for air filtration system, the sample hole has an injector.

10. As described in claim 8 for the turbulence device used for air filtration system, the between the sample porous plate and the porous plate there is at least an adjusting screw to adjust the distance between the sample porous plate and the porous plate.

11. As described in claim 10 for the turbulence device used for air filtration system, the sample porous plate has at least a screw hole corresponding to at least one screw hole on the sample porous plate, so an adjusting screw can pass through the screw hole on the sample porous plate and the screw hole on the porous plate to adjust the distance between the sample porous plate and the porous plate.

* * * * *